United States Patent [19]

Chao

[11] Patent Number: 5,519,740
[45] Date of Patent: May 21, 1996

[54] REACTOR CONTROL HAVING TRANSIENT MITIGATION SYSTEM

[75] Inventor: Fred C. Chao, Saratoga, Calif.

[73] Assignee: General Electric Company, San Jose, Calif.

[21] Appl. No.: 133,240

[22] Filed: Oct. 7, 1993

Related U.S. Application Data

[63] Continuation-in-part of Ser. No. 909,343, Jul. 6, 1992, Pat. No. 5,309,485.

[51] Int. Cl.⁶ .................................................. G21C 7/36
[52] U.S. Cl. .......................... 376/216; 364/274.6; 395/900
[58] Field of Search .................................... 376/215, 216, 376/217; 364/274.6; 395/900, 907

[56] References Cited

U.S. PATENT DOCUMENTS

| | | | |
|---|---|---|---|
| 5,263,123 | 11/1993 | Hayashi | 395/900 |
| 5,351,200 | 9/1994 | Impink, Jr. | 395/900 |

Primary Examiner—Daniel D. Wasil
Attorney, Agent, or Firm—James E. McGinness

[57] ABSTRACT

A transient mitigation system and method of operation is provided for a nuclear reactor having a reactor core. A plurality of monitors monitor operation of the reactor. A plurality of independent feedback control systems control respective reactor operations. The transient mitigation system is integrated with the control systems for automatically adjusting a selected one thereof to mitigate abnormal behavior of the monitored operations. A data base contains predetermined membership functions of monitoring and control parameters, each membership function including a plurality of discrete adjacent ranges having respective values. An encoder identifies membership ranges and values for respective singular monitoring parameter values which are evaluated in predetermined fuzzy control rules to select a control parameter and membership range to mitigate the abnormal behavior. A decoder provides a single value mitigating signal for the selected control parameter range to mitigate the abnormal behavior.

12 Claims, 8 Drawing Sheets

REACTOR CONTROL HAVING TRANSIENT MITIGATION SYSTEM

This is a continuation-in-part of application Ser. No. 07/909,343, filed Jul. 6, 1992, now U.S. Pat. No. 5,309,485.

The present invention relates generally to nuclear reactors, and, more specifically, to a system for monitoring performance of the reactor core for determining the cause of abnormal behavior.

BACKGROUND OF THE INVENTION

A conventional boiling water reactor (BWR) includes a pressure vessel containing a reactor core for boiling water to generate steam for powering a steam turbine-generator for generating electrical power, for example. The BWR includes several conventional closed-loop control systems which control various individual operations of the BWR in response to demands.

For example, a conventional recirculation flow control system (RFCS) is used to control core flowrate, which in turn controls output power of the reactor core. A conventional control rod drive system, i.e. rod control system (RCS), controls the control rod position and thereby control rod density within the reactor core for controlling reactivity therein. A conventional feedwater control system controls the feedwater supplied to the pressure vessel, including its flowrate and thereby the water level within the pressure vessel, and the feedwater temperature is also controlled. And a conventional turbine control controls steam flow from the BWR to the turbine based on load demands and pressure regulation. All of these systems as well as other conventional systems utilize various monitoring parameters of the BWR for controlling operation thereof. Exemplary conventional operating parameters which are monitored include core flow or flowrate effected by the RFCS, core pressure which is the pressure of the steam discharged from the pressure vessel to the turbine, neutron flux, feedwater temperature and flowrate, steam flow or flowrate provided to the turbine, core power, and various status indications of the BWR systems. Many of the monitoring parameters include conventional monitors or sensors for directly measuring the monitored operating parameter, whereas other monitoring parameters such as core power are conventionally calculated using other monitoring parameters, and the status monitoring parameters are provided as output signals from the respective systems.

Conventional control parameters which include several of the monitoring parameters listed above are conventionally used for controlling operation of the BWR. The control parameters include, for example, core flow which controls reactor output power, control rod position which controls reactivity in the core, and feedwater flow and temperature which control water level within the pressure vessel and subcooling of the water contained therein, respectively. The several control systems conventionally control operation of the reactor in response to given demand signals such as load demand. A computer program is conventionally used to analyze thermal and hydraulic characteristics of the reactor core for the control thereof. The analysis is based on nuclear data selected from analytical and empirical transient and accident events, and from conventional reactor physics and thermal-hydraulic principles. For example, core response to core flow changes in a BWR is related to conventionally known temperature, Doppler, Void, and power coefficients of reactivity, which reflect the conventional reactor physics and thermal-hydraulic principles.

However, in the event of an abnormal transient event, the operator on duty in the control room is required to manually react to the event at the very moment of the event based on his training, experience, and judgment. The remedial action taken may or may not be correct depending on the training and knowledge of the operator, and, in the latter event, an unnecessary reactor scram may be required. Furthermore, some transient events may occur exceptionally fast, and faster than the capability of a human operator to react thereto. In such an event, a reactor scram may be automatically effected.

One of the conventional reactor control systems is the nuclear system protection system (NSPS) which is a multichannel electrical alarm and actuating system which monitors operation of the reactor, and upon sensing an abnormal event initiates action to prevent an unsafe or potentially unsafe condition. The NSPS conventionally provides three functions: (1) reactor trip which shuts down the reactor when certain monitored parameter limits are exceeded; (2) nuclear system isolation which isolates the reactor vessel and all connections penetrating the containment barrier; and (3) engineered safety feature actuation which actuates conventional emergency systems such as cooling systems and residual heat removal systems, for example.

Unless the operator promptly and properly identifies the cause of an abnormal transient event in the operation of the reactor, and promptly effects remedial or mitigating action, the nuclear system protection system will automatically effect reactor trip, which is undesirable if not required.

SUMMARY OF THE INVENTION

A transient mitigation system and method of operation are provided for a nuclear reactor having a reactor core. A plurality of monitors monitor operation of the reactor. A plurality of independent feedback control systems control respective reactor operations. The transient mitigation system is integrated with the control systems for automatically adjusting a selected one thereof to mitigate abnormal behavior of the monitored operations. A data base contains predetermined membership functions of monitoring and control parameters, each membership function including a plurality of discrete adjacent ranges having respective values. An encoder identifies membership ranges and values for a respective singular monitoring parameter value which are evaluated in predetermined fuzzy control rules to select a control parameter and membership range to mitigate the abnormal behavior. A decoder provides a single value mitigating signal for the selected control parameter range to mitigate the abnormal behavior.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
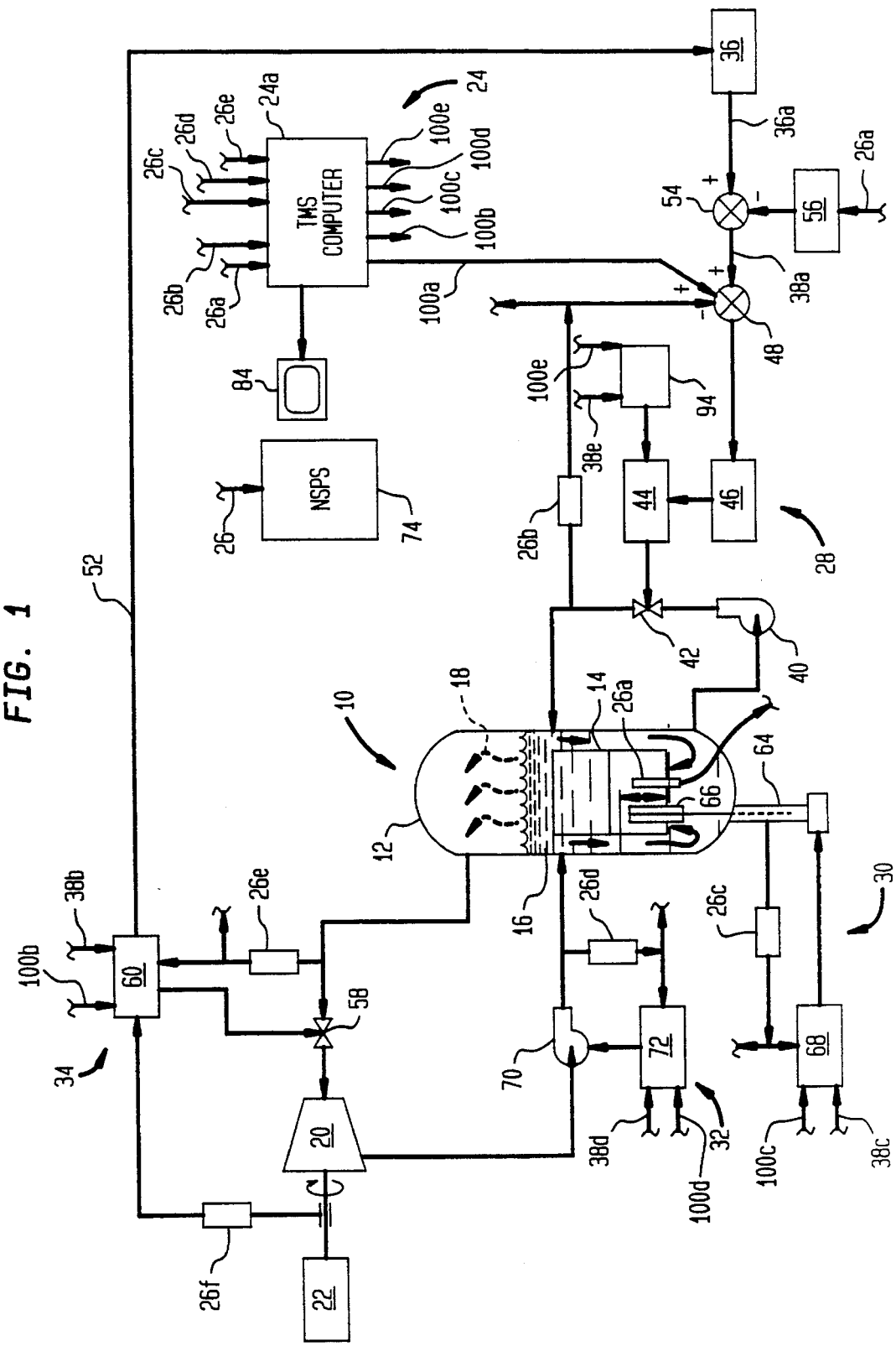
FIG. 1 is a schematic representation of a control system including a transient mitigation system (TMS) for a nuclear reactor in accordance with one embodiment of the present invention.

Illustrated schematically in FIG. 1 is an exemplary nuclear reactor 10 including a reactor pressure vessel 12 containing a nuclear reactor core 14 which in this exemplary embodiment is effective for boiling water 16 to generate steam 18. The boiling water reactor (BWR) 10 is used in this exemplary embodiment for providing the steam 18 to a conventional steam turbine 20 which rotates a conventional electrical generator 22 for providing electrical power to a conventional electrical utility grid.

In accordance with the present invention, a transient mitigation system (TMS), also referred to as a core automated monitoring system (CAMSYS), is indicated generally at 24 and is provided in conjunction with the reactor 10 for automatically monitoring the operation thereof to identify normal and abnormal operation and predict or identify the cause of abnormal transient events, and then provide a diagnosis thereof for evaluation by a human operator so that the operator may take corrective mitigative action, or such action may be taken automatically by the TMS 24.

The TMS 24 uses a plurality of conventional sensors or monitors indicated collectively by the numeral 26 which provide input signals thereto. The monitors 26 are conventionally operatively joined to the reactor 10 and its various independent feedback, closed-loop primary control systems for monitoring operation of the reactor 10 including its core 14, with each monitor 26 providing a corresponding electrical signal for a respective monitored operating parameter designated MP. Exemplary monitoring parameters MP in respective feedback control systems include:

neutron flux $MP_1$ provided by a conventional neutron flux monitor 26a in the reactor core 14 and operatively joined to the TMS 24;

core flowrate $MP_2$ provided by a conventional core flowrate monitor 26b found in a conventional recirculation flow control system (RFCS) 28;

control rod density $MP_3$ provided by conventional position monitors 26c, conventionally found in a conventional rod control system (RCS) 30;

feedwater temperature $MP_4$ and flowrate $MP_5$ provided by conventional temperature and flowrate monitors, both monitors indicated schematically by the single box labeled 26d, in a conventional feedwater system 32 which separately controls feedwater flowrate and temperature; and reactor pressure $MP_6$ provided by a conventional pressure sensor 26e in a conventional pressure regulated turbine control system 34 operatively joined to the pressure vessel 12.

Additional, exemplary, conventional monitoring parameters include core thermal power, steam flow, reactor vessel water level, status of the several control systems such as the RFCS 28, the RCS system 30, the feedwater system 32, and the turbine control system 34.

These exemplary monitors, indicated generally by the numeral 26, are conventionally operatively joined through electrical lines to their respective primary control systems which conventionally receive suitable demand signals 38 from the plant control room. More specifically, the RFCS 28 is conventionally used in a boiling water reactor to control output power therefrom. The RFCS 28 includes a conventional recirculation pump 40 operatively joined to the pressure vessel 12 for receiving a portion of the water 16 therein, which water 16 is pumped to a conventional control valve 42 and back into the pressure vessel 12 for providing forced recirculation flow therein as is conventionally known. A conventional positioner or actuator 44 controls the position of the valve 42, and therefore the flowrate therethrough, in response to a conventional flow controller 46 operatively joined thereto. A conventional summer 48 receives a flow demand signal 38a and subtracts the monitored core flowrate signal $MP_2$ (26b) in a conventional closed, feedback loop for automatically maintaining the desired value of core flowrate $MP_2$ (26b). A conventional load demand error signal 52 is provided by the turbine control 34 to a load, or master, controller 36, which conventionally provides an output signal 36a to another conventional summer 54 for combination with the neutron flux signal from the monitor 26a provided by a conventional flux controller 56 to generate the required flow demand signal 38a. The conventional turbine control system 34 also includes a conventional control valve 58 operatively joined between the pressure vessel 12 and the steam turbine 20 for conventionally controlling the flow of the steam 18 therethrough, and also includes a conventional speed monitor 26f for providing an additional speed feedback signal to a conventional pressure regulated turbine controller 60. The turbine controller 60 has conventional input signals such as a pressure demand signal 38b conventionally provided thereto.

The RCS system 30 further includes a plurality of conventional control rod drives 64, represented schematically by the single control rod drive 64 illustrated in FIG. 1, which conventionally insert and withdraw conventional control rods 66 into and out of the reactor core 14. A conventional rod controller 68 is operatively joined to the drive 64 and the control rod density monitor 26c, which monitors position of the control rods 66 within the reactor core 14 and, therefore, the collective density thereof. The rod controller 68 conventionally receives rod position demand signals 38c for controlling the density of the control rods 66 within the reactor core 14.

And, lastly in the exemplary embodiment illustrated in FIG. 1, the feedwater system 32 includes a conventional feedwater pump 70 operatively joined between the condenser of the turbine 20 and the pressure vessel 12 for pumping the condensate from the turbine 20 as feedwater into the pressure vessel 12. A conventional feedwater flow controller 72 is conventionally joined in a closed feedback loop in communication with the feedwater pump 70 and the feedwater monitor 26d which provides an indication of the feedwater flowrate $MP_5$ to the controller 72, with the controller 72 also conventionally receiving a signal for the water level within the pressure vessel 12. A feedwater flowrate demand signal 38d is conventionally provided to the controller 72.

The structures and functions of the feedback control systems 28, 30, 32, and 34 are conventional for controlling operation of the reactor 10. Of course, additional conventional systems also exist and operate similarly to those already described in conventional closed loop operation.

In the event of an abnormal operation or condition of the reactor 10, the plant operator is required to analyze the condition and determine what mitigating action is required, which is conventionally manually effected by the operator from the control room. For example, a severe abnormal event such as a loss of coolant accident (LOCA) typically requires shut down of the reactor 10 known as a reactor trip or scram. In order to automatically monitor operation of the reactor 10 and provide automatic reactor trip, a conventional nuclear system protection system (NSPS) 74 is provided. The NSPS 74 is an independent system which conventionally receives signals from selected ones of the several monitors 26 and, upon sensing an abnormal condition, initiates action to prevent an unsafe or potentially unsafe condition. The NSPS 74 may effect a reactor trip and shut down the reactor 10 when certain limits of the monitoring parameters MP are exceeded. The NSPS 74 may also effect isolation of the pressure vessel 12 and all connections of the primary pressure boundary that penetrate the containment barrier. And, the NSPS 74 may actuate conventional engineered safety feature systems such as core cooling and residual heat removal for protecting the reactor 10. However, the NSPS 74 is able only to monitor operation of the reactor 10 and initiate these predetermined actions upon sensing the required abnormal conditions. The NSPS 74 is not able to determine the cause of the abnormal condition, which cause is typically determined by the operator based on the experience and knowledge of the operator to evaluate any abnormal conditions observed. The NSPS 74 is also not able to provide any mitigation measures to prevent a reactor trip from occurring.

Figure 2:
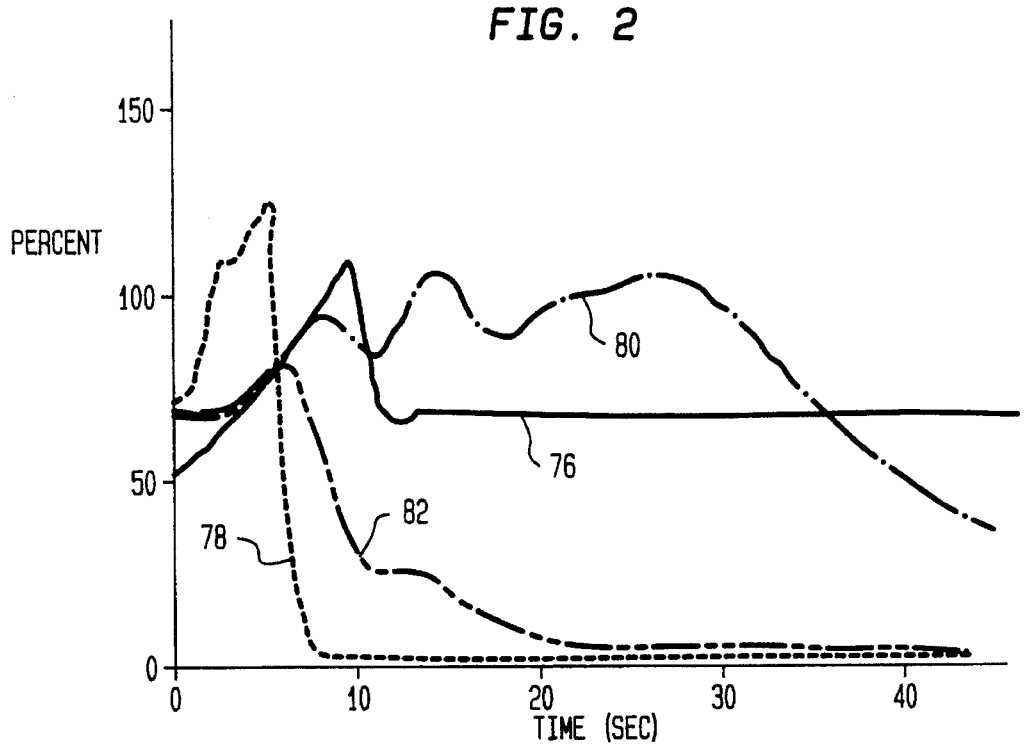
FIG. 2 is a graph plotting exemplary monitoring parameters, based on percent of rated value versus time, for the reactor illustrated in FIG. 1.

For example, illustrated in FIG. 2 is a graph plotting time in seconds on the abscissa and percent of rated value on the ordinate. Shown in solid line designated 76 is a core flowrate ($MP_2$) curve provided by the monitor 26b; shown in dashed line 78 is a neutron flux ($MP_1$) curve provided by the monitor 26a; shown in dash-dot line 80 is a feedwater flowrate ($MP_5$) curve provided by the monitor 26d; and shown in dash-double dot line 82 is steam flowrate from the vessel 12 to the turbine 20 provided by a conventional monitor (not shown). At time zero in the graph, an abnormal transient event begins which causes a corresponding change in the several monitoring parameters illustrated in FIG. 2 as well as in other conventional monitoring parameters not shown in this example. Confronted with the changing curves illustrated in FIG. 2, including the many more not shown therein, an operator would attempt to determine the cause of the abnormality based on the experience and knowledge of the operator, and then attempt to mitigate the problem. Since various types of abnormalities may occur in the operation of the relatively complex reactor 10, detecting the abnormality and then attempting to mitigate the abnormality within a time period compatible with human reaction capability may be relatively easy to relatively difficult depending on the abnormality and the operator's ability.

In accordance with the present invention, the TMS 24 is provided for automatically identifying abnormal and normal behavior of the monitoring parameters MP; automatically determining the cause of the abnormal behavior of the monitoring parameters MP; and then at least providing a warning to the operator in the control room which identifies the likely cause.

Figure 3:
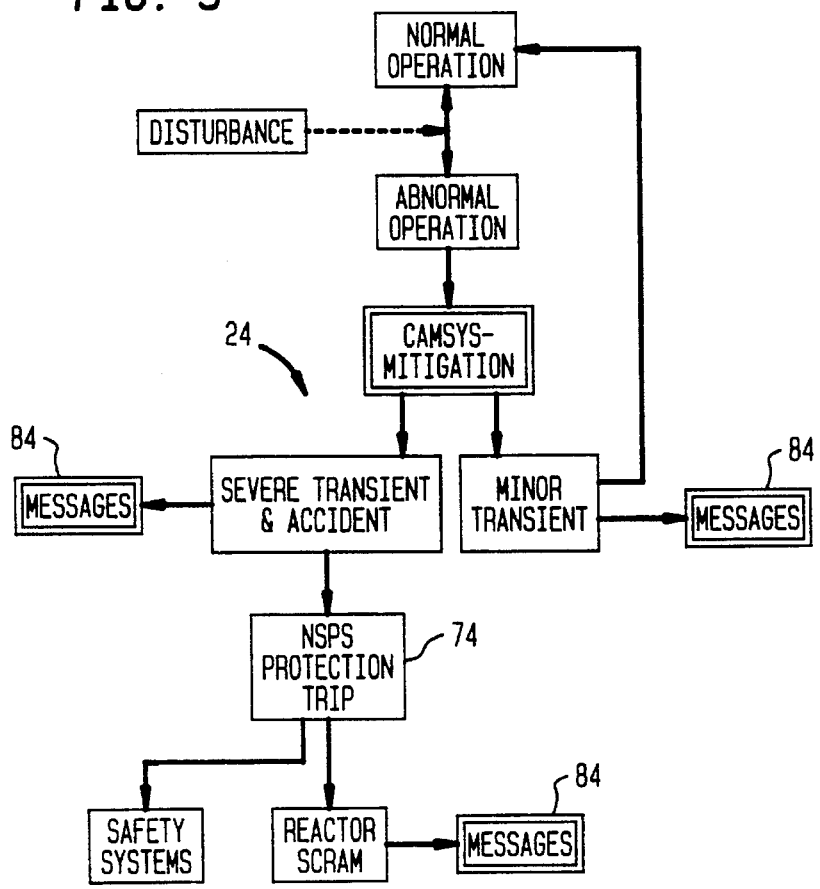
FIG. 3 is a flow chart representation of the TMS used in combination with the reactor 10 illustrated in FIG. 1.

The overall relationship of the TMS 24 to plant operation is illustrated in FIG. 3. When normal plant operation is disturbed by an external disturbance, such as an operator error or a component malfunction, the plant then enters an abnormal status. The disturbance may effect a minor transient condition in the reactor which may be stabilized or corrected by the conventional control systems as would typically occur during normal operation of the plant. The disturbance may effect a severe transient or accident event which will activate the NSPS 74 to effect reactor scram. Accordingly, a primary function of the TMS 24 is to automatically detect the abnormal status early in the transient event and provide a warning to the plant operator through a conventional monitor 84, for example located in the plant control room. The warning will preferably indicate the likely cause of the abnormal event which preferably can also be automatically mitigated by the TMS 24 for reducing the consequences resulting from the abnormal condition. The monitoring and mitigation control functions of the TMS 24 are preferably totally independent from the NSPS 74 so that the safety operation of the NSPS 74 is not affected by the TMS 24 and will operate as intended. Safe plant scram operation is always available if the severe transient or accident event cannot be mitigated either manually by the plant operator or automatically by the TMS 24.

The TMS 24 illustrated in FIG. 1 preferably includes a TMS computer 24a which may be a conventional programmable microprocessor containing the required data base stored in memory, and monitoring and control software algorithms in accordance with the present invention. The signals from the monitors 26 are provided directly therefrom to the TMS computer 24a in parallel with the several control systems 28, 30, 32, 34 and the NSPS 74 as shown by the broken lines indicating the electrical connections therebetween.

Figure 4:
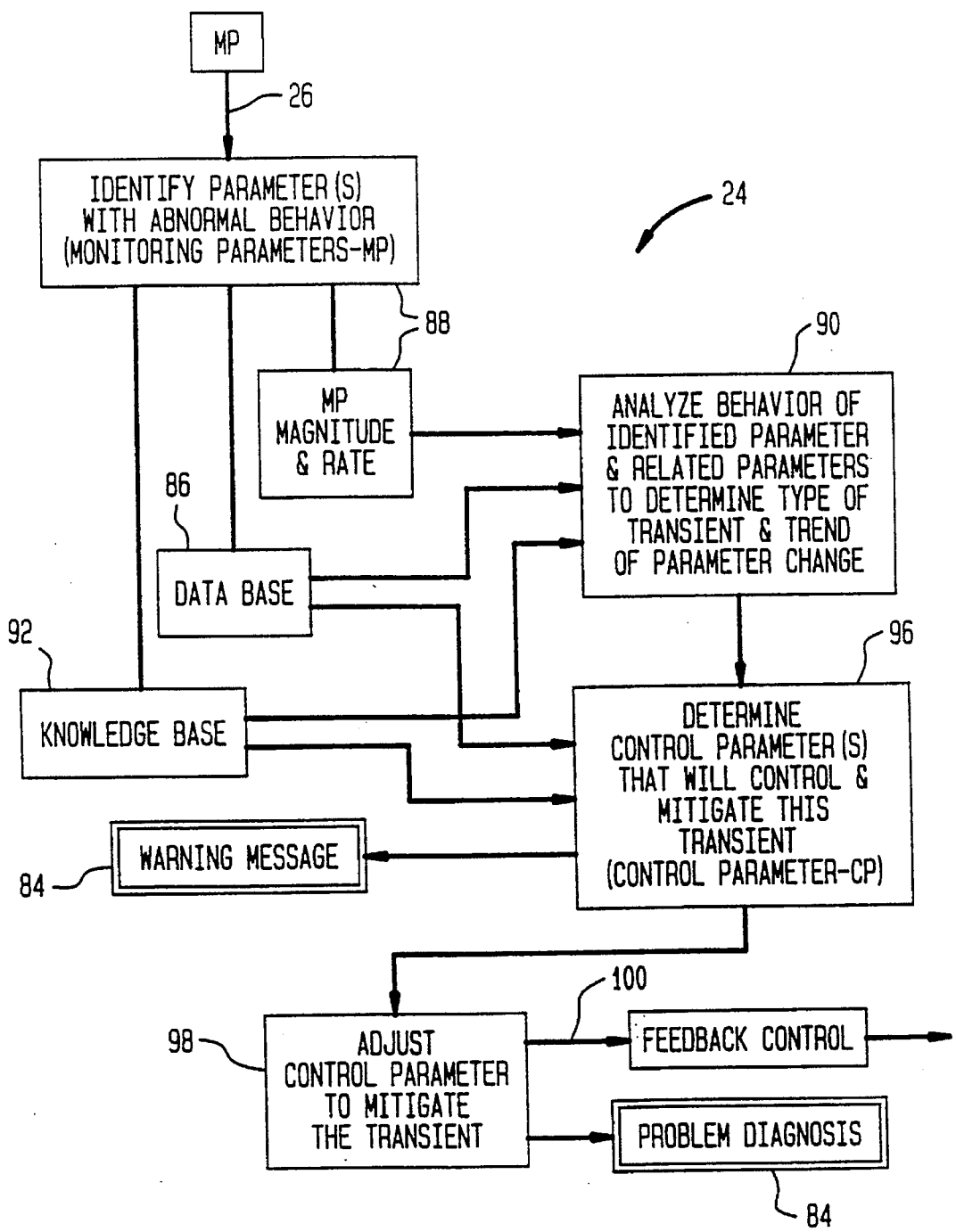
FIG. 4 is a flow chart of the basic logic processing within the TMS illustrated in FIGS. 1 and 3.

The basic logic processing flow chart for the TMS 24 is illustrated in FIG. 4 which receives the input signals of the several monitoring parameters MPs from the respective monitors 26, such as the exemplary signals represented by the curves of FIG. 2. Since many of the monitoring parameters are interrelated by conventional reactor physics and thermal hydraulic principles, a single abnormal event will effect transient operation in many of the monitoring parameters. Accordingly, the TMS 24 is a knowledge-based system containing predetermined artificial intelligence rules selected for identifying abnormal and normal behavior of the monitoring parameters, and from the abnormal monitoring parameter, determining the cause of the abnormal behavior.

For example, an operator examining the monitoring parameter curves illustrated in FIG. 2 would use learned experience and knowledge in an attempt to analyze the behavior and predict the cause thereof. In FIG. 2, an abnormal condition occurs at time zero with all of the exemplary monitoring parameters increasing at various rates. Of course, in normal transient events such as those following a conventional demand for power increase, the monitoring parameters also increase, or decrease as the case may be, based on normal behavior thereof which adds to the difficulty in predicting abnormal over normal behavior. In FIG. 2, an unidentified abnormal cause leads to a rapid increase in neutron flux ($MP_1$) as shown by the curve 78, which upon reaching a predetermined setpoint of about 120% of rated value effects a protective reactor trip or scram by the NSPS 74 for shutting down the reactor 10, which occurs at about 7 seconds. Shortly thereafter the steam flowrate decreases to about 0% as shown by curve 82, and the core flowrate $MP_2$ and feedwater flowrate $MP_5$ as represented by the curves 76 and 80 behave in a normal fashion following a reactor trip.

The conventional NSPS 74 conventionally monitors and protects operation of the reactor 10 using the several monitors 26 and conventionally senses abnormal behavior thereof which may include a particular monitoring parameter exceeding a predetermined magnitude limit or setpoint or a predetermined rate of change of that magnitude as represented by a corresponding limit or setpoint. Depending upon the severity of the abnormal behavior, the NSPS 74 effects reactor scram, isolation, and/or the safety systems. However, the NSPS 74 does not include the capability to identify the cause of the abnormal behavior or prevent reactor trip.

Accordingly, the TMS 24 illustrated in FIG. 4 preferably includes a conventional data base 86 containing predetermined setpoint or limit values for the monitoring parameters MPs such as those used in the NSPS 74, which include magnitude and rate of change setpoints for differentiating between normal and abnormal behavior of the several monitoring parameters MPs being monitored. The setpoints in the data base 86 are more stringent than those in the NSPS 74 to allow for earlier action. The TMS 24 further includes conventional means 88 for identifying abnormal and normal behavior of the monitoring parameters based on the data base 86. Analyzing the monitoring parameters MP and comparing them to predetermined data bases containing magnitude and rate of change setpoints is conventional. In the preferred embodiment, the General Electric Transient Monitor (GETRAM) disclosed in U.S Pat. No. 4,678,622 — W. S. Rowe et el, incorporated herein by reference, may be used for identifying abnormal transient rates of change such as the excessive increase in neutron flux $MP_1$ shown in the curve 78 of FIG. 2 immediately following the initiation of the abnormal event, In the example illustrated in FIG. 2, the identifying means 88 shown in FIG. 4 uses the predetermined setpoints contained in the data base 86 to examine each of the monitored parameters MPs to identify and validate those that affect performance of the reactor core 14 and which indicate abnormal behavior. Each of the monitoring parameters MPs is examined for abnormal behavior. For example, if one of the MPs has an increased rate that is higher than a certain setpoint rate in the data base 86, then this MP indicates an abnormal increase relative to normal plant operation.

In the FIG. 2 example, the identifying means 88 identify that the core flowrate $MP_2$, neutron flux $MP_1$, feedwater flowrate $MP_5$, and steam flowrate among others are changing and that the neutron flux $MP_1$ shown in curve 78 is increasing at an abnormal, excessive rate.

As shown in FIG. 4, the TMS 24 further includes means 90 for automatically determining the cause of the abnormal behavior of the monitoring parameters MPs without direct human input by the plant operator, for example. The cause determining means 90 include predetermined artificial intelligence rules, e.g. software algorithms, associated with each of the monitoring parameters MPs for analyzing and determining the cause of the abnormal behavior based on performance of preselected ones of the monitoring parameters MPs using the data base 86 and a predetermined knowledge base 92.

More specifically, once the abnormally behaving monitoring parameters are identified in the first task by the identifying means 88, the identified abnormal parameter, or primary monitoring parameter, is further analyzed in a second task by the determining means 90 along with the most closely related monitoring parameters, or secondary monitoring parameters, to determine the characteristics of the transient including type of transient and trend of parameter change for identifying the cause of the abnormal behavior. This is accomplished by using the predetermined knowledge base 92 which is implemented in the predetermined artificial intelligence rules associated with each of the monitoring parameters.

Since an abnormal condition will typically be reflected in changes of several of the monitoring parameters, it is necessary to evaluate those related parameters to discern abnormal from normal behavior in order to identify cause. The knowledge base 92, therefore, preferably includes at least one, and in the preferred embodiment all three, of (1) predetermined analytical transient and accident operating performances of the reactor 10 which are conventionally obtained; (2) actual operating records of transient and accident operating performances of the reactor 10 which are also conventionally obtained; and (3) the interrelationship of the primary and secondary monitoring parameters based on predetermined reactor physics and thermal hydraulic principles which are also conventionally obtained, For example, analytical and empirical data are conventionally known which indicate core performance based on changes in core flow and control rod density changes, for example, or based on accidents such as the LOCA. And, core response to core flow changes is reflected in four interrelated variables, i.e., core void fraction, Doppler coefficient, core inlet enthalpy change, and xenon concentration change, as is conventionally known. In this way, the secondary monitoring parameters may be preselected for each primary monitoring parameter to determine the abnormal behavior cause based thereon.

Figure 5:
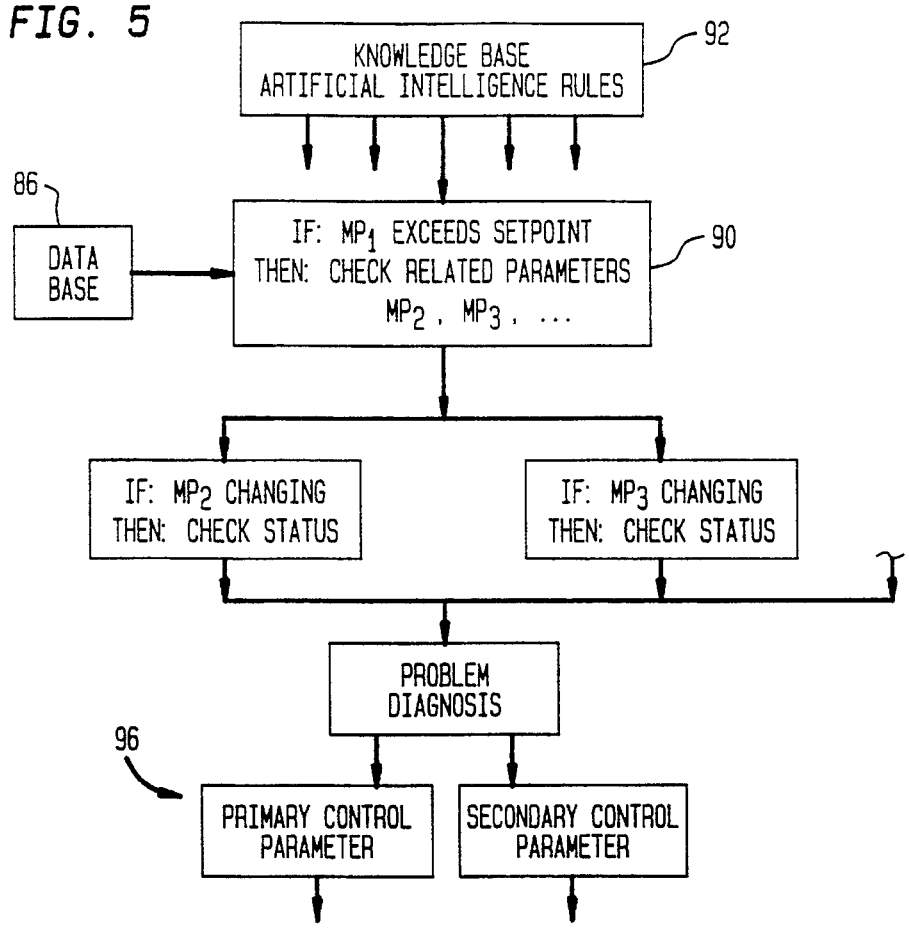
FIG. 5 is a flow chart representing exemplary artificial intelligence rules based on the knowledge base illustrated in FIG. 4.

One example of the required artificial intelligence rules for the FIG. 2 example include the following rules represented schematically in FIG. 5:

(1) If the primary monitoring parameter, e.g. $MP_1$, such as neutron flux (curve 78) exceeds a predetermined setpoint such as an excessive rate increase as identified by GETRAM, then check related secondary parameters $MP_2$, $MP_3$, etc., such as core flowrate (curve 76) and control rod density change rates (based on the positions of the several control rods 66).

(2) If the secondary monitoring parameter $MP_2$, such as core flowrate (curve 76) is changing, or increasing for example, then check status of its respective control system, e.g. the RFCS 28, to determine whether it is demanding such change or not.

(3) If the secondary monitoring parameter $MP_3$ is changing, for example, control rod density is changing, then check status of its control system, e.g., RCS system 30 for automatic or manual operation thereof.

(4) Diagnose abnormal problem based on predetermined interrelationship of the primary monitoring parameter $MP_1$ and the secondary monitoring parameters $MP_2$, $MP_3$, etc., for example, if the core flowrate increases at an excessive rate, and if there is no demand for such increase, and if there is no control rod density change, then there is a control problem in the RFCS 28.

Accordingly, the cause of the abnormal behavior of the example illustrated in FIG. 2 is determined to be loss of control of the core flowrate (curve 76) which is increasing substantially linearly. For example, the flow controller 46 illustrated in FIG. 1 may fail, causing the control valve 42 to abnormally open and increase the core flowrate through the reactor core 14. As the core flowrate increases (curve 76), the neutron flux increases rapidly (curve 78), and unless mitigating action is effected, the NSPS 74 will effect a reactor trip as shown in FIG. 2 at about 7 seconds from initiation of the failure of the flow controller 46.

The TMS 24 can, well within the time before reactor trip, identify the problem, such as the failure of the flow controller 46, and provide a warning through the monitor 84 to the plant operator in the control room which identifies the cause of the abnormal behavior. For example, the warning displayed by the monitor 84 may simply state "CORE FLOW ABNORMAL INCREASE."

The operator may then effect mitigating action, manually without automatic operation from TMS 24, for example, by conventionally placing tile flow controller 46 in manual, and sending a suitable override signal 38e as shown in FIG. 1 to a conventional manual override controller 94 operatively joined to the actuator 44, and by conventionally actuating the RCS 30 (signal 38c) to insert selected control rods 66.

In this exemplary embodiment, the primary monitoring parameter is neutron flux $MP_1$ and the secondary monitoring parameters include core flowrate $MP_2$ and control rod density change rate $MP_3$, and may also include feedwater flowrate $MP_5$ and reactor pressure $MP_6$ all conventionally known to be interrelated. And, the artificial intelligence rules identify the recirculation flow control system problem as a likely cause of the abnormal behavior of the neutron flux exceeding a given setpoint wherein the core flowrate also exceeds a given setpoint without normal demand therefor, and the control rod density change rate is substantially unchanged.

Of course, this is but one relatively simple example of the artificial intelligence rules contained in the knowledge base 92 of the TMS computer 24a. As shown in FIG. 5, these rules are but one branch of the many branches which may be created for evaluating each desired monitoring parameter MP and interrelated secondary monitoring parameters. The artificial intelligence rules may be as sophisticated as desired based on the degree of sophistication to conventionally analyze abnormal symptoms in advance and provide suitable artificial intelligence rules for allowing the causes of the abnormal symptoms to be analyzed and identified with suitable accuracy. The rules may be as simple as the exemplary rules presented above or may be more complex based upon conventionally known interrelationships of parameter trends as defined by reactor physics and thermal-hydraulic principles as well as on analytical and empirical data reflecting plant transient and accident events.

The TMS computer 24a may further include as shown in FIG. 4 additional means 96 for determining at least one control parameter CP to control or mitigate the monitoring parameter abnormal behavior either displayed through the monitor 84 to the operator for manual correction, or for automatic mitigation effected by the TMS 24 itself. Exemplary conventionally known control parameters CPs include core flowrate and control rod position, which are the primary parameters for controlling operation of a boiling water reactor, with additional control parameters including feedwater flowrate, load demand, and others including several of the monitoring parameters M Ps themselves. There is an overlap between the monitoring parameters MPs and the control parameters CPs which is conventionally known, with some parameters providing both monitoring information and control functions. As shown in FIGS. 4 and 5, the control parameter determining means 96 use suitable artificial intelligence rules from the knowledge base 92 and data from the data base 86 to determine which control parameters CPs may be used to mitigate the abnormal transient event.

For example, once it is determined that the flow controller 46 has failed and, therefore, control over the core flowrate has been lost, the core flowrate becomes the primary control parameter $CP_1$ for controlling the excessive increase in neutron flux. One or more secondary control parameters may also be selected which also assist in controlling the neutron flux such as control rod position which effects control rod density $CP_2$ in the reactor core 14 and therefore neutron flux. The secondary control parameters are preselected for each predetermined abnormal symptom and are contained in the knowledge base 92, again based upon conventionally known interrelationships of the parameters based on reactor physics and thermal hydraulic principles and analytical and empirical plant transient and accident events. For a predetermined abnormal symptom, primary and secondary control parameters may be specified in the knowledge base 92 for use as required when confronting actual abnormal symptoms.

For the example presented in FIG. 2 and discussed above, the warning message displayed in the monitor 84 may identity the failure of the flow controller 46 and suggest mitigation control by manually adjusting the core flowrate $CP_1$, i.e., by decreasing the flowrate, or by inserting the control rods 66 to increase rod density $CP_2$, or both, for preventing the neutron flux level from exceeding the setpoint leading to reactor scram.

As described above, the mitigating action may be taken manually by the operator from the plant control room, or, the TMS 24 may further include means 98 for automatically adjusting the primary or secondary control parameters CPs, or both, to mitigate the monitoring parameter abnormal behavior as shown schematically in FIG. 4. The TMS computer 24a illustrated in FIG. 1 may simply include additional conventional control commands, e.g. in a dedicated TMS controller, which will forward suitable mitigating signal or signals, e.g. 100a–e, to the appropriate control systems, e.g. 28, 30, 32, 34.

Once the cause of the abnormal behavior is identified and a suitable control parameter CP for mitigating the abnormal behavior is determined, the control parameter CP may be automatically adjusted by the means 98 to provide a suitable corrective or mitigating signal to mitigate the abnormal transient behavior. For the example presented above, the flow controller 46 shown in FIG. 1 may be bypassed by automatically providing the mitigating signal from the TMS computer 24a as an override signal 100e, comparable to override signal 38e, directly to the manual override controller 94 to suitably close the abnormally open control valve 42 to reverse the excessive core flowrate and, thereby, reverse the abnormal increase in neutron flux. At the same time, another mitigating signal 100c, comparable to demand signal 38c, may be automatically provided by the means 98 within the TMS computer 24a to the rod controller 68 to further insert selected control rods 66 for also reducing the neutron flux to a more normal level. And, yet another mitigating signal 100d, comparable to demand signal 38d, may be provided to flow controller 72 to suitably adjust feedwater flow.

The TMS computer 24a may also provide a mitigating signal 100a directly to the summer 48 to automatically adjust recirculation flow as required during abnormal events when the flow controller 46 is functioning properly and does not require override.

As shown in FIG. 4, the schematic feedback control joined to a respective output line 100 which carries the respective mitigating signal is any suitable feedback control system of the reactor 10 which is selected for mitigating the abnormal behavior. The monitor 84 may then also display the problem diagnosis and the corrective action automatically effected. The adjusting means 98 may provide a suitable mitigating signal to the respective feedback control systems of the reactor 10 for conventional closed loop feedback operation. The degree of control adjustment depends on the severity of the abnormal transient. This can be achieved through conventional logic that responds to substantially instantaneous and infinitesimal changes of the MP signal. Preferably, the adjusting means 98 within the TMS computer 24a includes conventional "fuzzy" logic for mitigating the abnormal transient event. Fuzzy logic as described hereinbelow may be useful to improve mitigation performance where the interrelationship between the several parameters is complex and in view of the prolonged conventional time lags and oscillatory responses between demand changes in the control parameters and the response as observed by the monitoring parameters in conventional continuous control logic.

Figure 6:
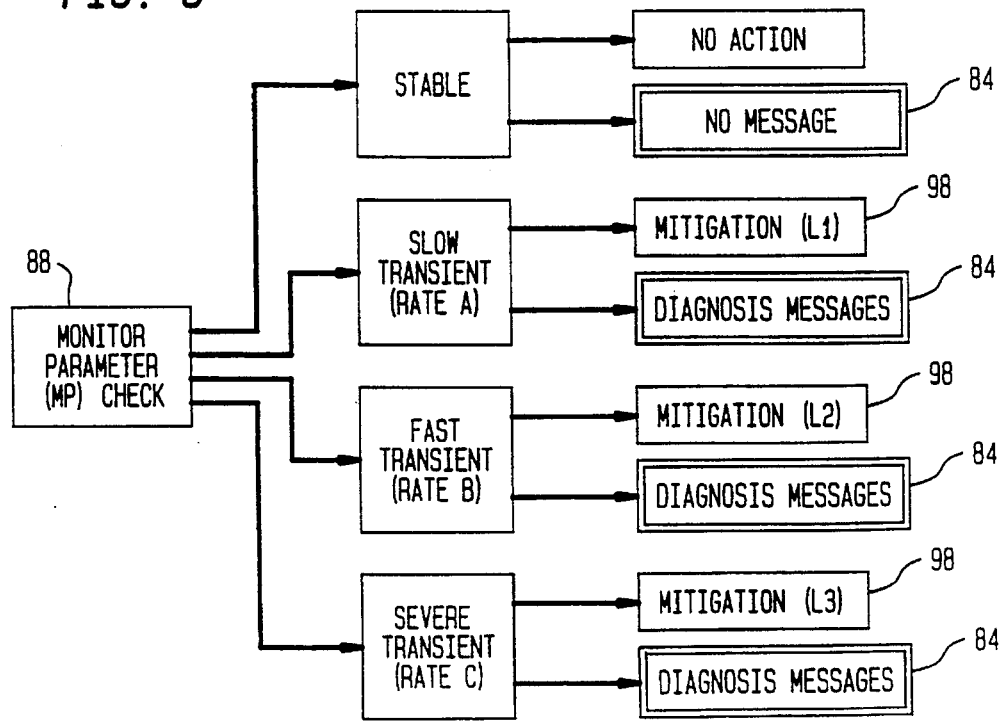
FIG. 6 is a flow chart representation for determining the degree of transient rate of the abnormal monitoring parameter being identified in FIG. 4.

Since transient abnormal events may vary in rate from relatively slow to relatively fast, the identifying means 88 illustrated in FIG. 4 may be conventionally selected to discern the different rates as illustrated schematically in FIG. 6. The rate of change of the monitoring parameter MP may be conventionally determined, for example by using the GETRAM, which determines the rate of the abnormal behavior including a first rate A which may be classified as a slow transient, a second rate B which may be classified as a fast transient relative to the slow transient, and a third rate C which may be classified as a very fast or severe transient which is in turn faster than the fast transient of rate B. The three rates A, B, and C are preferably predetermined ranges of rates with the range below the slow transient rate A being defined as stable operation wherein no mitigating action is required or taken and no message is displayed from the monitor 84. If any one monitoring parameter MP is greater than the stable rate of change, it will fall into one of the three rates A, B, and C which will determine the respective levels L1, L2, and L3 of mitigation required, either displayed in the monitor 84 to be effected manually by the operator in the control room or effected automatically by the adjusting means 98. As shown additionally in FIG. 3, the slow and fast transients may be considered minor transients which can be mitigated without reactor scram, whereas the severe transient, including an accident event, will require actuation of the NSPS 74 to scram the reactor 10 and isolate the reactor and effect the safety systems as conventionally required.

Accordingly, the adjusting means 98 may include suitable algorithms indicating the respective levels L1, L2, and L3 of mitigation required based on the severity of the observed abnormal transient. Again with respect to the core flowrate example presented above, if the increase in core flowrate is relatively slow, the mitigation level L1 may merely require manual control of the actuator 44 by the manual override controller 94 in response to the TMS computer 24a, or the control rods 66 may be additionally inserted into the core 14 as directed by the TMS computer 24a. For automatic control by the TMS computer 24a in level L1, mitigation is effected using relatively small corrections. If the core flowrate abnormality is within the fast transient range, the second mitigation level L2 may require at least both of these corrective actions with medium-sized corrections. And, if the core flowrate increase is within the severe transient range, with the neutron flux level increasing at a severe rate, the third mitigation level L3 is effected with the largest corrections. The NSPS 74 may possibly effect reactor scram if the mitigation is not effective to ameliorate the abnormal behavior quickly enough, but its independent operation is nevertheless maintained.

For example, the NSPS 74 is actuated when the neutron flux curve 78 of FIG. 2 reaches a predetermined maximum limit such as the 120% illustrated in FIG. 2. However, the TMS 24 may automatically mitigate the cause of the neutron flux abnormal increase prior to it reaching the 120% limit, thus preventing reactor scram. Since the TMS 24 is completely independent of the operation of the NSPS 74, an improved, and now intelligent, overall system is obtained with the NSPS 74 retaining its ability to effect reactor scram.

Since the TMS 24 is microprocessor based using the computer 24a, all required logic therein may be conventionally programmed using conventional software algorithms. The degree of sophistication and complexity of the algorithms may vary from relatively simple to relatively complex based on the experience and knowledge base intended to be utilized. The TMS 24 preferably includes evaluation of the magnitude and rates of change of the several monitoring parameters MPs. It may also further include second-order changes in the monitoring parameters. Although the exemplary monitoring parameters MPs are those specifically associated with performance of the reactor core 14 itself, additional monitoring parameters may be utilized for monitoring other plant functions indirectly associated with performance of the core 14. Conventional principles of neural networks which may be combined with fuzzy logic technology may be also utilized for more extensive monitoring and control of plant abnormal operating status.

Figure 7:
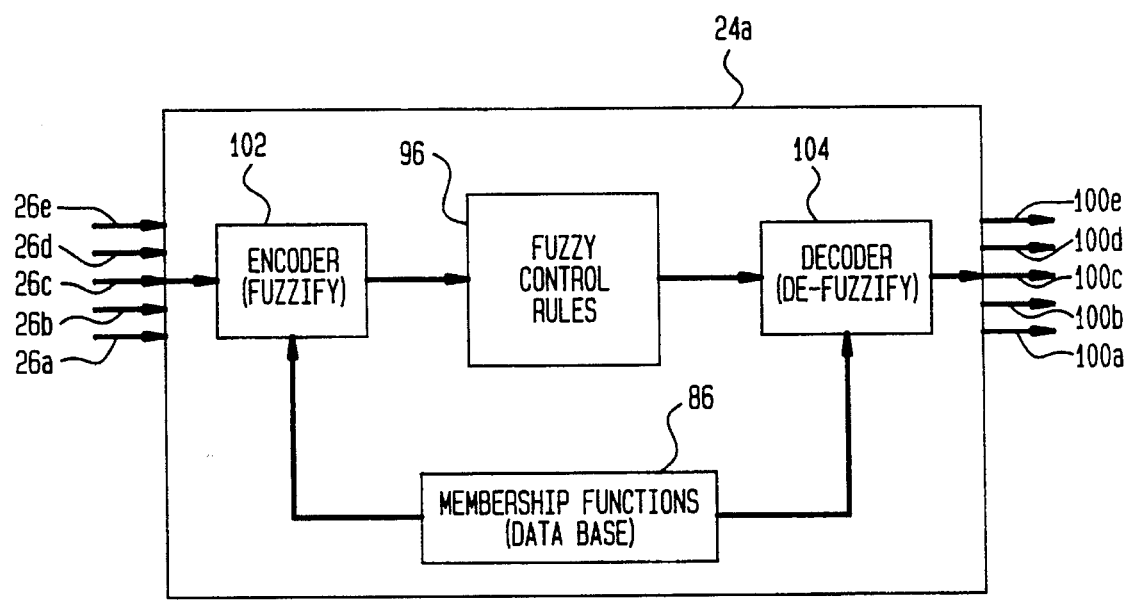
FIG. 7 is a schematic, block diagram for the fuzzy logic implemented transient mitigation system.

More specifically, the fuzzy logic implementation of the mitigation of the transient abnormal operation is illustrated in the schematic block diagram of FIG. 7. Conventional control or logic systems use singular or crisp values of parameters, whereas fuzzy logic systems operate using ranges or non-singular values of parameters. Fuzzy logic is known to provide improvement in systems which are complex and based on human expert judgments, which therefore allows their use in reactor control for mitigating transient abnormal behavior which conventionally requires expert human judgment to avoid reactor scrams.

In accordance with one embodiment of the present invention, fuzzy logic control is integrated in the transient mitigation system to improve the operation thereof. Traditional, bilevel Boolean logic uses conventional IF-THEN statements which are either true or false or have respective numerical values of either 1 or 0. Accordingly, traditional Boolean logic requires the use of singular values of the monitoring parameters MP. However, fuzzy logic differs from traditional crisp, singular value Boolean logic by also using non-singular fractional values from 0 to 1. Both systems use conventionally known membership functions which are graphs plotting the particular parameter on the abscissa and the degree or value of membership from 0 to 1 on the ordinate. A traditional crisp set may take the exemplary form of a square step function having a constant value of 1 over the selected range of the input parameter with 0 degree of membership outside the range or set. An analogous fuzzy set or range would resemble a trapezoid, for example, with a flat top plateau representing the membership value of 1, and left and right side ramps wherein the membership value decreases from 1 to 0 over finite ranges of the input parameter, and therefore has fractional or partial membership between 0 and 1 along its side ramps. A fuzzy logic set therefore allows both 0 and 1 membership values as well as partial membership values between 0 and 1.

Figure 8:
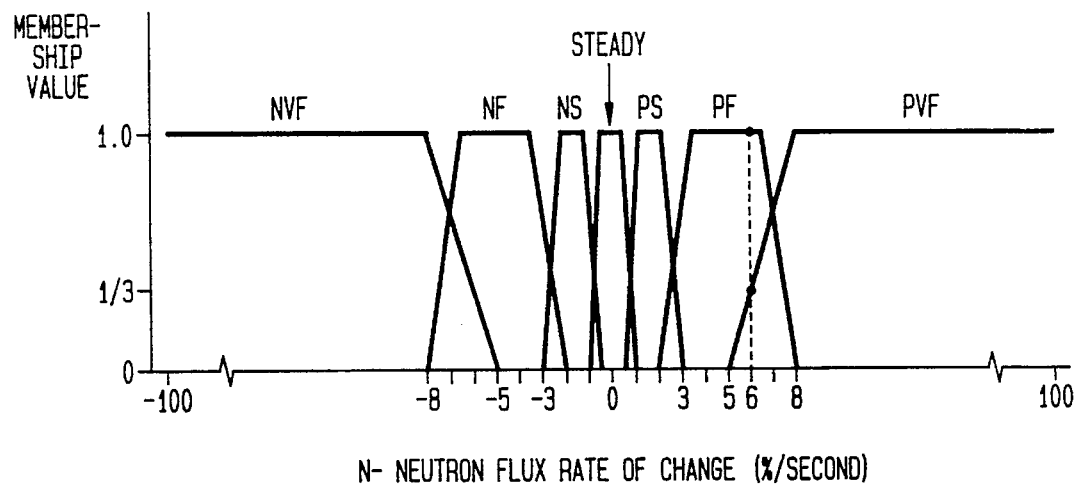
FIG. 8 is an exemplary membership function for neutron flux rate of change.

As part of the transient mitigation system 24 of the present invention, FIGS. 8–11 illustrate four exemplary membership functions configured for control of the nuclear reactor 10 illustrated in FIG. 1. More specifically, FIG. 8 is an exemplary input membership function indicating the membership value from 0 to 1.0 for the neutron flux rate-of-change in %/second and identified by the parameter N which is the time derivative of $MP_1$. Seven exemplary ranges of the flux rate N are plotted which take the exemplary, general form of trapezoids overlapping each other at adjacent ramps. The center or STEADY range bridges the 0 value of the flux rate N followed in turn in both the positive and negative directions by respective positive and negative ranges Slow, Fast, and Very Fast, i.e. PS, PF, PVF, and NS, NF, and NVF. These exemplary ranges are relatively narrow and closer together near the 0 value of the flux rate N to improve operation of the transient mitigation system.

Figure 9:
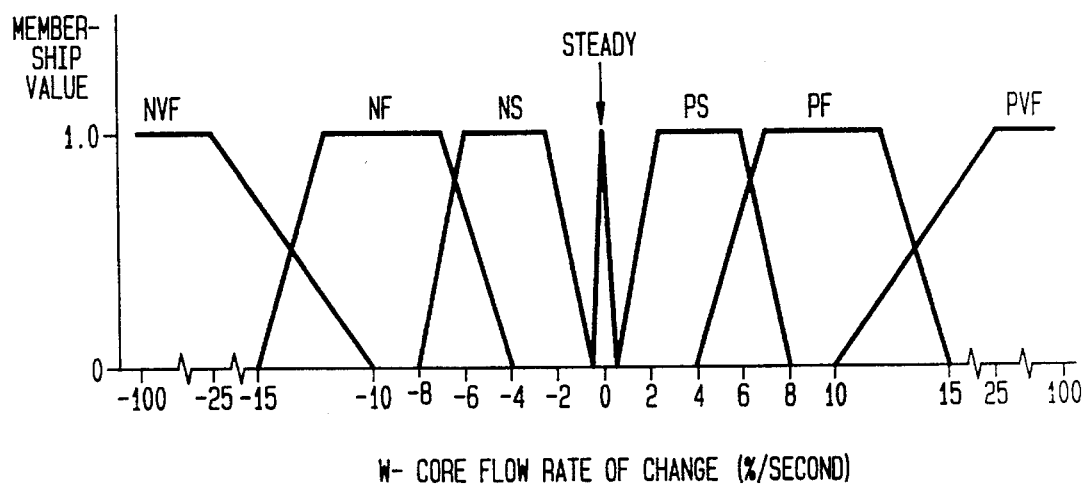
FIG. 9 is an exemplary membership function for core flow rate of change.

FIG. 9 is an exemplary input membership function for the core flow rate-of-change expressed in %/second and identified by the parameter W which is the time derivative of $MP_2$. The parameter W similarly has seven exemplary ranges, with a center STEADY range bridging the zero (0) value of parameter W, with adjoining positive and negative ranges identified as Slow, Fast, and Very Fast, i.e. PS, PF, PVF and NS, NF, NVF, respectively. The STEADY range is in the form of an isosceles triangle with its apex having a 1.0 membership value. The adjacent ranges thereto are in the general form of trapezoids having respective side ramps which overlap each other.

Figure 10:
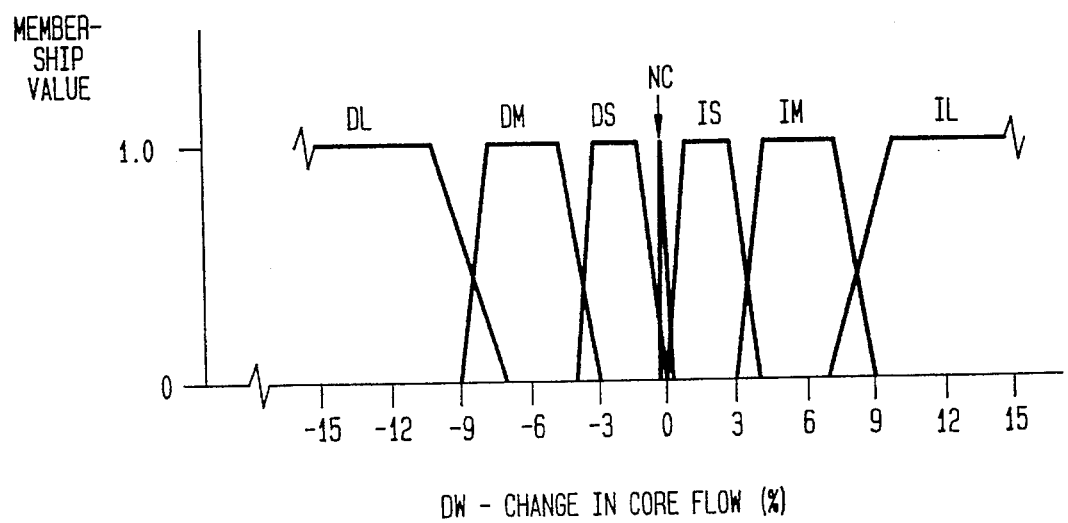
FIG. 10 is an exemplary membership function for change in core flow.

FIG. 10 is an exemplary output membership function for the change in core flow expressed in % and identified as DW which similarly includes seven ranges including a triangular no change (NC) center range bridging the 0 value of DW, with respective increasing and decreasing Slow, Medium, and Large ranges, i.e. IS, IM, IL and DS, DM, DL, respectively. The noncenter ranges are similarly in the general form of trapezoids with adjoining side ramps overlapping each other.

Figure 11:
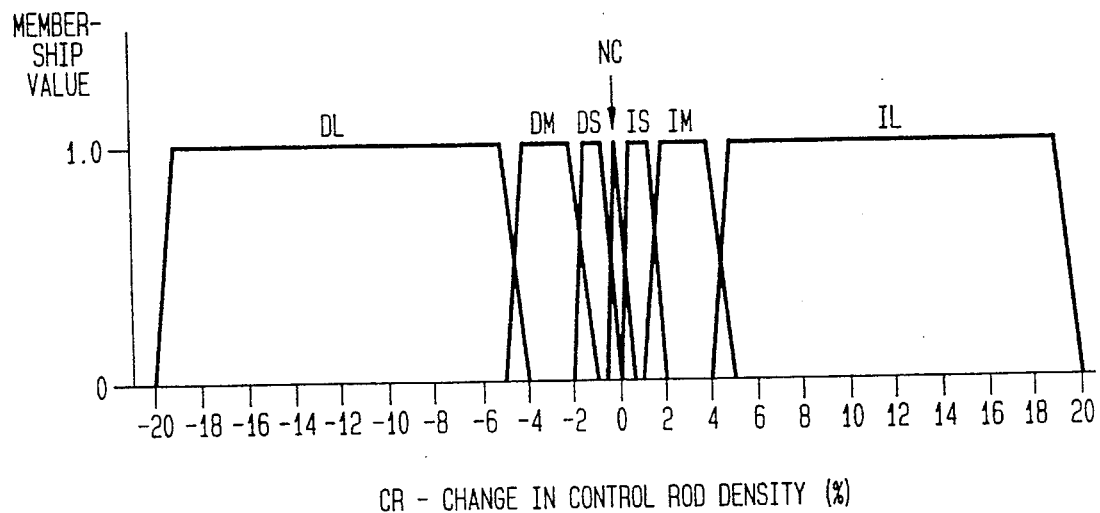
FIG. 11 is an exemplary membership function for change in control rod density.

And, FIG. 11 is an exemplary output membership function for change in control rod density expressed in % and identified as CR which is equal to the change in the parameter $MP_3$. This membership function also includes seven overlapping ranges including a triangular no change (NC) center range bridging the 0 value of CR, with respective increasing and decreasing Slow, Medium, and Large ranges, i.e. IS, IM, IL and DS, DM, DL, respectively. The ranges adjacent to the center NC range are in the general form of trapezoids having adjoining side ramps which overlap each other.

In all four exemplary membership functions illustrated in FIGS. 8–11, the adjoining negative or positive, or decreasing or increasing ranges adjacent to the center, 0 value ranges thereof are relatively narrow and closer together than the extreme left and right ranges to provide more accurate mitigation control during operation. Although each of the membership functions includes seven exemplary ranges shown in the general form of trapezoids or triangles, fewer or more ranges as desired may be selected and having any suitable configuration. The number of ranges is preselected to correspond with the predetermined fuzzy control rules used for effective mitigation, and the widths of the respective ranges and slopes of their respective ramps are selected for each design application to approximate the expert human experience and knowledge of the plant operator in evaluating abnormal transient conditions and the required mitigation therefor which is effected in the fuzzy control rules. The ramps are linear in the examples illustrated, but may have any suitable non-linear configuration as desired.

More specifically, the exemplary membership functions illustrated in FIGS. 8–11 are predetermined based on analytical and operating performance of the reactor 10 during transient and accident conditions and conventionally known reactor physics and thermal hydraulic principles. They are stored with other suitable membership functions in the data base 86 illustrated in FIG. 7 with the flux rate N and the flow change rate W representing monitoring parameters MP, and the core flow change DW and density change CR representing exemplary control parameters CP. Each of the membership functions as shown for example in FIGS. 8–11 includes a plurality of discrete adjacent ranges collectively covering predetermined minimum to maximum values of the respective monitoring and control parameters, with each of the ranges having respective membership values or degrees ranging from the minimum of 0 to a maximum of 1.0.

As shown in FIG. 7, the data base 86 is conventionally contained in the TMS computer 24a which receives the monitoring parameters MP from their respective monitors 26a–e. Means for encoding, or simply encoder 102 is operatively joined to the monitors 26a–e and the data base 86 for receiving the monitoring parameter signals, and is effective for identifying the membership ranges and values based on each of the monitoring parameter signals, or fuzzify the singular, crisp input signals. For example, for an exemplary value of the neutron flux rate N of 6 as illustrated in FIG. 8, the encoder 102 identifies two ranges at this value, i.e. Positive Fast (PF) with a membership value of 1.0, and Positive Very Fast (PVF) with a partial membership value of about ⅓. The encoder 102 provides these output values for each of the monitoring parameters and their respective membership functions to the means 96 which is operatively joined to the encoder 102 for selecting or determining the control parameter CP to mitigate the abnormal behavior of the affected monitoring parameter. The selecting means 96 includes a plurality of predetermined fuzzy control rules associated with each, primary one, of the monitoring parameters MP and with a proselected related, secondary one of the monitoring parameters MP, and based on the membership ranges and membership values from the encoder 102 one or more of the control parameters CP and the values thereof are selected to mitigate the abnormal behavior.

Exemplary fuzzy logic control rules in the form of IF-THEN rules include the following:

| Rule | 1 | IF | N | is | PVF | and | W | is | PVF | THEN | DW | is | DL |
|---|---|---|---|---|---|---|---|---|---|---|---|---|---|
| Rule | 2 | IF | N | is | PF | and | W | is | PVF | THEN | DW | is | DL |
| Rule | 3 | IF | N | is | PS | and | W | is | PVF | THEN | DW | is | DL |
| Rule | 4 | IF | N | is | STEADY | and | W | is | PVF | THEN | DW | is | DL |
| Rule | 5 | IF | N | is | NS | and | W | is | PVF | THEN | DW | is | DL |
| Rule | 6 | IF | N | is | NF | and | W | is | PVF | THEN | DW | is | DL |
| Rule | 7 | IF | N | is | NVF | and | W | is | PVF | THEN | DW | is | DL |
| Rule | 8 | IF | N | is | PVF | and | W | is | PF | THEN | DW | is | DL |

| | | | | | | | | | | | |
|---|---|---|---|---|---|---|---|---|---|---|---|
| Rule | 9 | IF | N | is | PF | and | W | is | PF | THEN | DW is DM |
| Rule | 10 | IF | N | is | PS | and | W | is | PF | THEN | DW is DM |
| Rule | 11 | IF | N | is | STEADY | and | W | is | PF | THEN | DW is DM |
| Rule | 12 | IF | N | is | NS | and | W | is | PF | THEN | DW is DM |
| Rule | 13 | IF | N | is | NF | and | W | is | PF | THEN | DW is DM |
| Rule | 14 | IF | N | is | NVF | and | W | is | PF | THEN | DW is DM |
| Rule | 15 | IF | N | is | PVF | and | W | is | PS | THEN | DW is DL |
| Rule | 16 | IF | N | is | PF | and | W | is | PS | THEN | DW is DM |
| Rule | 17 | IF | N | is | PS | and | W | is | PS | THEN | DW is DS |
| Rule | 18 | IF | N | is | STEADY | and | W | is | PS | THEN | DW is DS |
| Rule | 19 | IF | N | is | NS | and | W | is | PS | THEN | DW is DS |
| Rule | 20 | IF | N | is | NF | and | W | is | PS | THEN | DW is DS |
| Rule | 21 | IF | N | is | NVF | and | W | is | PS | THEN | DW is DS |
| Rule | 22 | IF | N | is | PVF | and | W | is | STEADY | THEN | DW is DL |
| Rule | 23 | ID | N | is | PF | and | W | is | STEADY | THEN | DW is DM |
| . | | | | | | | | | | | |
| Rule | 50 | IF | N | is | PVF | and | W | is | PVF | THEN | CR is IL |
| Rule | 51 | IF | N | is | PF | and | W | is | PVF | THEN | CR is IL |
| Rule | 52 | IF | N | is | PS | and | W | is | PVF | THEN | CR is IL |
| Rule | 53 | IF | N | is | STEADY | and | W | is | PVF | THEN | CR is IL |
| Rule | 54 | IF | N | is | NS | and | W | is | PVF | THEN | CR is IL |
| Rule | 55 | IF | N | is | NF | and | W | is | PVF | THEN | CR is IL |
| Rule | 56 | IF | N | is | NVF | and | W | is | PVF | THEN | CR is IL |
| . | | | | | | | | | | | |
| Rule | (i) | IF | ... | | | | | | | THEN | ... |

These exemplary fuzzy control rules use the predefined ranges of the membership functions illustrated in FIGS. 8–11 for example, to determine the required range of mitigation required. For example Rule 1 indicates that IF the neutron flux rate of change N is Positive Very Fast, and the core flow rate of change W is also Positive Very Fast, THEN the change in core flow DW required is Decreasing Large. The fuzzy control rules are based on thermal hydraulic principles and on learned experience in operating the controlled reactor 10 and may be as simple or as complex as appropriate. The membership functions of FIGS. 8 and 9 represent input parameters which are the subject of the IF conditions and, the membership functions illustrated in FIGS. 10 and 11 represent output parameters of the THEN conditions which indicate the required level of mitigation required. As indicated above, abnormal behavior may be classified as a Slow, Fast, or Very Fast transient with rates A, B, and C, which require different levels L1, L2, and L3 of mitigation. The output membership functions illustrated in FIGS. 10 and 11 each illustrate seven levels of mitigation, including no change NC, corresponding with the need to mitigate abnormal behavior in a positive or negative sense.

As indicated above, at least two of the ranges in each of the membership functions illustrated in FIGS. 8–11 are trapezoidal in form with spaced apart leading and trailing side ramps defining partial membership values from the minimum value of zero to the maximum value of 1.0, with a plateau extending between the tops of the ramps defining full membership at the maximum, 1.0 value. In the FIG. 8–9 membership functions, the extreme left and right ranges extend to negative and positive infinity as a practical matter with the respective ramps therefor being omitted. And, FIGS. 9–11 illustrate that the center range is in the form of an isosceles triangle bridging the respective 0 parameter values. Since many of the adjacent ranges in the respective membership functions have overlapping leading and trailing ramps, singular input values of the parameters can result in two simultaneous membership ranges and values being effected. And, one or more output ranges will be effected by the conditional THEN rule for effecting mitigation. However, since the primary control systems of the reactor 10 utilize crisp or singular values therein, the ranges of the mitigating control parameter must be converted to the required singular values for implementation.

More specifically, means for decoding, or simply decoder 104 as illustrated in FIG. 7 is operatively joined to the selecting means 96, data base 86, and the plurality of respective primary control systems 28, 30, 32, and 34 to provide the respective mitigating signals 100a–e for the selected control parameter CP effective for mitigating the abnormal behavior. The decoder 104 is used to de-fuzzify the one or more output ranges determined by the conditional THEN statements in the fuzzy control rules to provide a singular or crisp value of the mitigating signal 100 for implementation.

The fuzzy control rules 1-(i) listed above are conventionally contained in software in the TMS computer 24a illustrated in FIG. 7 and are evaluated in real-time based on the monitoring parameter signals 26a–e from the respective monitors. Continuing with the flow control problem discussed above, the neutron flux rate of change N may have a singular value at a specific time equal to positive 6.0 as shown in FIG. 8. The encoder 102 determines that this value corresponds with two input ranges, i.e. Positive Fast with a membership value of 1.0, and Positive Very Fast with a partial membership value of ⅓. At the same time, the core flow rate of change W has an exemplary value of about 0, with the encoder 102 determining a single input range, i.e. STEADY with full membership of 1.0. Since the various input membership functions preferably have overlapping side ramps, it is likely that two or more rules will be simultaneously triggered for providing mitigating action. For example, Rule 22 requires a change in core flow DW of Decreasing Large, with Rule 23 indicating that the change in core flow DW is Decreasing Medium. Since Rules 22 and 23 require not only ranges, or nonsingular, mitigation action, but also at different levels, i.e. DL and DM, an additional procedure is required to return a singular or crisp value as the mitigating signal 100 to be effected in the respective primary control system.

Various methods for providing crisp, singular output values from membership function ranges are conventionally known. For the present transient mitigation system 24, utilizing two IF preconditions in each of the fuzzy control rules, the respective two singular values of the monitoring parameters are firstly matched in the respective input membership functions to provide the respective membership values thereof. For the exemplary monitor readings of N=6.0 and W=0, Rule 22 is associated with a membership value of ⅓ for the PVF range in neutron flux rate of change N (see FIG. 8), and a membership value of 1.0 for the STEADY range in core flow rate of change W (see FIG. 9). These two IF preconditions are then combined using the conventionally known minimum function which yields the minimum or lesser membership value of the primary and secondary monitoring parameters, i.e. ⅓ (N) which is less than 1.0 (W). Similarly for triggered Rule 23, the minimum or lesser value is 1.0 since both the PF range in the neutron flux rate of change N and the STEADY range in the core flow rate of change W are both equal to 1.0. The strength of Rule 22 is therefore ⅓, and the strength of Rule 23 is 1.0 based on this minimum selection method.

The strengths of each Rule 22 and 23 are then applied to the conclusions or THEN conditions thereof, i.e. DL and DM. This is illustrated schematically in FIG. 12 which shows an enlargement of the two adjacent membership ranges DL, shown in dashed line, and DM shown in solid line for the change in core flow parameter DW. The decoder 104 is conventionally effective for providing a singular value of the output parameter or mitigation signal based on the Boolean union of the adjacent membership ranges DL and DM in the output membership function of the selected control parameter DW based on the respective strengths thereof.

Figure 12:
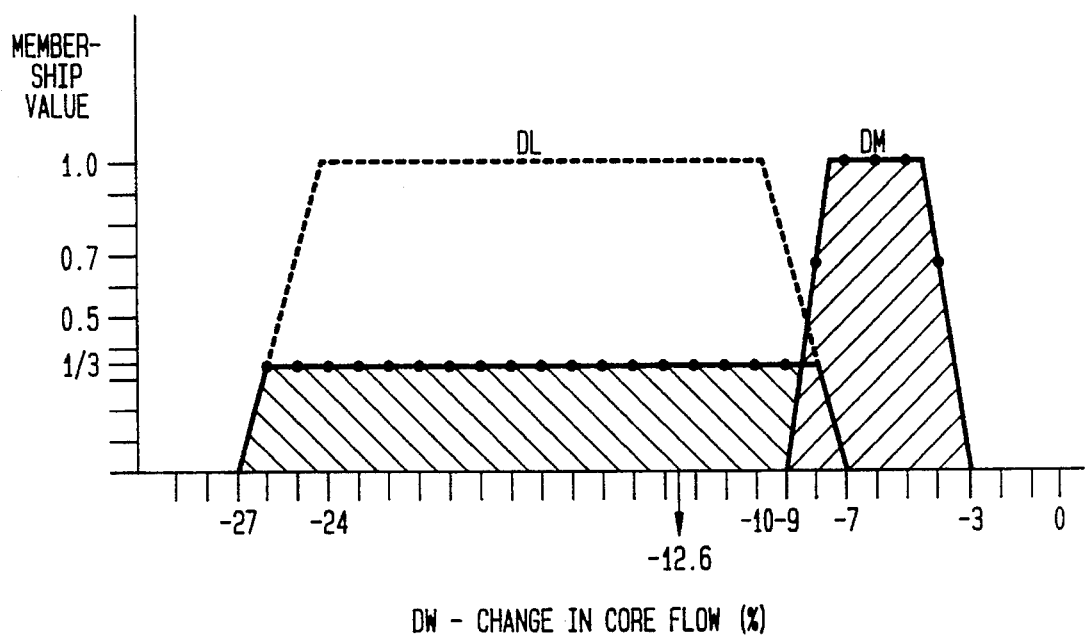
FIG. 12 is an enlarged portion of the change in core flow membership function illustrated in FIG. 10 showing two adjacent ranges and a resultant singular output value therefrom.

The singular output value of the DW mitigating signal is preferably equal to about the conventionally known center of area or center of gravity of the adjacent membership ranges DL and DM. As shown in FIG. 12, the ⅓ strength of Rule 22 is applied to the nominal, or full strength range DL which provides the truncated range shown in solid line and cross hatched. Similarly, the strength of 1.0 of Rule 23 is applied to its conclusion DM which results in the nominal or full strength DM range illustrated in FIG. 12 in solid line and cross hatched. In order to provide a singular output value of DW, the conventional center of area method of the union of the triggered ranges DL and DM is applied which is simply the sum of the products of the discrete, integer values of the output parameter DW and the respective membership value thereof divided by the sum of solely the respective membership values corresponding thereto. For the exemplary embodiment illustrated in FIG. 12, the resulting output value of the change in core flow $DW_o$ is calculated as follows:

$$DW_o = \frac{SUM(DW_i \times \text{Membership Value}_i)}{SUM(\text{Membership Value}_i)}$$

$$DW_o = -\frac{(1/3 \times (26+25\ldots+10+9) + 0.7 \times 8 + 1.0 \times (7+6+5) + 0.7 \times 4)}{(1/3 \times 18 + 0.7 + 1 + 1 + 1 + 0.7)}$$

$$DW_o = -\frac{131.4}{10.4} = -12.6$$

The resulting center of area of the union of the two adjacent membership value ranges DL and DM modified by the respective strengths of Rules 22 and 23 results in a singular output value of the change in core flow $DW_o$ of about −12.6. This value is provided as the mitigating signal 100e to the RFCS system 28 to reduce the core flowrate $CP_1$ by −12.6% for the example introduced above. Similarly, one or more of the rules 50 et seq may be triggered for effecting change in control rod density CR (FIG. 11) which will lead to inserting the control rods 66 to increase control rod density $CP_2$ as an additional mitigation action.

Accordingly, the fuzzy control rules described above are effective for evaluating predetermined ranges of the monitoring parameters for indicating corresponding predetermined ranges of the control parameters to be used for mitigating abnormal transient behavior. The predefined membership functions stored in the data base 86 provide fuzzy ranges for both the monitoring parameters and the control parameters to fuzzify the singular monitored operating parameters in the encoder 102 for analysis by the fuzzy control rules in the selecting means 96, with the selected control parameter being de-fuzzified in the decoder 104 to produce the singular or crisp value of the mitigating signal 100 for use in the respective primary control system of the reactor 10. The transient mitigation system 24 therefore provides fuzzy logic feedback control to the primary reactor control systems which is independent from the NSPS 74. The NSPS 74 still maintains effective remedial action in the event that the abnormal behavior is not mitigated effectively by the TMS 24.

The fuzzy logic-based transient mitigation system 24 is implemented in suitable software algorithms in the TMS computer 24a, with the system providing a new method of controlling the reactor 10 to mitigate abnormal transient behavior thereof. The respective monitors 26 provide signals for the monitored or sensed operating parameters of the reactor 10 which are analyzed and encoded in the encoder 102 based on the membership functions in the data base 86 to provide the membership ranges and values thereof. The fuzzy control rules determine one or more control parameters for mitigating the abnormal behavior of one of the monitoring parameters, with the decoder 104 providing a singular or crisp value of the mitigating signal from the selected output ranges to mitigate the abnormal behavior. This method is continually repeated in real-time so that the remedial action is updated as the system operation changes.

The membership functions illustrated in FIGS. 8–11 are merely exemplary, which membership functions may take any suitable form depending upon the specific reactor system being developed. Although the center of area method is preferably used for determining the singular output values for the mitigating signals, other conventional methods may be used as desired.

Although the TMS 24 has been described with respect to a conventional boiling water reactor (BWR) it may also be used for other types of reactors such as a pressurized water reactor (PWR). The data base, knowledge base, and algorithms will, of course, be suitably modified to fit the operating principles of the PWR.

The TMS 24 is a flexible system providing the ability to monitor selected monitoring parameters which reflect core performance, for example, to determine abnormal operation thereof. And, most significantly, the TMS 24 utilizes artificial intelligence rules based on performance interrelationships between monitored parameters using conventional and well known principles including reactor physics and thermal-hydraulics, and analytical and empirical data representative of transient and accident events to determine the cause or causes of the abnormal behavior. The predicted cause is provided to the operator for his evaluation and action as required, or may be automatically mitigated by the TMS 24 as described above. The TMS 24, therefore, utilizes the predetermined knowledge base 92 to at least assist the operator in identifying abnormal transient causes for improving control of the reactor 10.

A commercially available software shell, such as that known as Fuzzy Inference Development Environment (FIDE) by Aptronix Company, is available for use in the development of the fuzzy control rules, input and output membership functions, encoder, and decoder. However, other available software may also be used as desired.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A reactor control system for controlling a nuclear reactor, comprising:

first and second monitors for monitoring operation of said reactor, said first and second monitors respectively providing first and second signals respectively representing the operative values for first and second monitoring parameters for operation of said reactor;

a feedback control system having a control parameter for controlling operation of said reactor;

a transient mitigation system integrated with said feedback control system for automatically adjusting said control parameter to mitigate abnormal behavior of one of said first and second monitoring parameters, said transient mitigation system comprising:

a data base containing a first predetermined membership function for said first monitoring parameter, a second predetermined membership function for said second monitoring parameter and a third predetermined membership function for said control parameter, said first membership function including a plurality of discrete adjacent ranges collectively covering an entire range of parameter values from a minimum parameter value to a maximum parameter value of said first monitoring parameter, said second membership function including a plurality of discrete adjacent ranges collectively covering an entire range of parameter values from a minimum parameter value to a maximum parameter value of said second monitoring parameter, and said third membership function including a plurality of discrete adjacent ranges collectively covering an entire range of parameter values from a minimum parameter value to a maximum parameter value of said control parameter, with each of said ranges having respective membership values, wherein at least two of said ranges in each of said first, second and third membership functions are generally trapezoidal in form with leading and trailing ramps defining a range of membership values from a minimum membership value to a maximum membership value, and with a plateau extending between said ramps defining full membership at said maximum membership value;

means for encoding operatively coupled to said data base and said first and second monitors for receiving said first and second monitoring parameter signals and effective for identifying membership ranges and membership values based on each of said first and second monitoring parameter signals;

means operatively coupled to said encoding means for applying a plurality of predetermined fuzzy logic control rules to select at least one range of said third membership function based on said ranges and membership values of said first and second membership functions identified by said encoding means in response to said first and second monitoring parameter signals; and means operatively coupled to said selecting means, said data base, and said feedback control system for decoding said at least one selected range of said third membership function to provide a control signal representing a singular mitigating value of said control parameter for mitigating said monitoring parameter abnormal behavior.

2. The control system according to claim 1 wherein said decoding means is effective for providing said singular mitigating value based on the lesser membership value corresponding to said first and second monitoring parameter signals.

3. The control system according to claim 1 wherein said decoding means is effective for providing said singular mitigating value based on the union of selected adjacent ranges in said third membership function.

4. The control system according to claim 3 wherein said singular mitigating value is equal to about the center of area of said selected adjacent membership ranges in said third membership function.

5. A method for controlling the operation of a nuclear reactor in dependence on first and second monitoring parameter input signals respectively received from first and second monitors placed inside the reactor, comprising the steps of:

providing a data base containing a first predetermined membership function for said first monitoring parameter, a second predetermined membership function for said second monitoring parameter and a third predetermined membership function for a control parameter, said first membership function including a plurality of discrete adjacent ranges collectively covering an entire range of parameter values from a minimum parameter value to a maximum parameter value of said first monitoring parameter, said second membership function including a plurality of discrete adjacent ranges collectively covering an entire range of parameter values from a minimum parameter value to a maximum parameter value of said second monitoring parameter, and said third membership function including plurality of discrete adjacent ranges collectively covering an entire range of parameter values from a minimum parameter value to a maximum parameter value of said control parameter, with each of said ranges having respective membership values, wherein at least two of said ranges in each of said first, second and third membership functions are generally trapezoidal in form with leading and trailing ramps defining a range of membership values from a minimum membership value to a maximum membership value, and with a plateau extending between said ramps defining full membership at said maximum membership value; p1 encoding each of said first and second monitoring parameter signals based on said data base to identify ranges and membership values of said first and second membership functions;

applying a plurality of predetermined fuzzy logic control rules to select at least one range of said third membership function based on said ranges and membership values of said identified first and second membership functions in response to said first and second monitoring parameter signals; and decoding said at least one selected range of said third membership function to provide a control signal representing a singular mitigating value of said control parameter for mitigating said monitoring parameter abnormal behavior.

6. The method according to claim 5 wherein said decoding step is effective for providing said singular mitigating value based on the lesser membership value corresponding to said first and second monitoring parameter signals.

7. The method according to claim 5 wherein said decoding step is effective for providing said singular mitigating value based on the union of selected adjacent ranges in said third membership function.

8. The method according to claim 7 wherein said singular mitigating value is equal to about the center of area of said selected adjacent membership ranges in said third membership function.

9. For a nuclear reactor including a reactor core and a plurality of monitors for monitoring operation of said reactor, each monitor providing a signal for a respective monitoring parameter, a transient mitigation system comprising:

a data base containing a plurality of predetermined membership functions for said monitoring parameters and a control parameter, each of said membership functions including a plurality of discrete adjacent ranges collectively covering predetermined minimum to maximum values of said monitoring parameters and said control parameter, with each of said ranges having respective membership values;

means for encoding said monitoring parameter signals for identifying membership ranges and values thereof;

means for selecting said control parameter to mitigate said monitoring parameter abnormal behavior, said selecting means including a plurality of predetermined fuzzy logic control rules associated with each primary one of said monitoring parameters and a preselected related secondary one of said monitoring parameters to select at least one range of said control parameter based on said membership ranges and values; and means for decoding said selected control parameter range for providing a singular mitigating signal for mitigating said abnormal behavior wherein at least two of said ranges in each of said membership functions are generally trapezoidal in form with spaced apart leading and trailing ramps defining partial membership values from minimum to maximum values, and with a plateau extending between said ramps defining full membership at said maximum value.

10. A system according to claim 9 wherein said decoding means is effective for providing a singular value of said mitigating signal based on the lesser membership value of said primary and secondary monitoring parameters.

11. A system according to claim 10 wherein said decoding means is effective for providing a singular value of said mitigating signal based on the union of adjacent membership ranges in said membership function of said selected control parameter.

12. A system according to claim 11 wherein said singular value of said mitigating signal is equal to about the center of area of said adjacent membership ranges.

* * * * *